(12) United States Patent
Samaan et al.

(10) Patent No.: US 7,463,992 B2
(45) Date of Patent: Dec. 9, 2008

(54) METHOD AND SYSTEM TO SELF-TEST SINGLE AND MULTI-CORE CPU SYSTEMS

(75) Inventors: Samie B. Samaan, Lake Oswego, OR (US); Victor Zia, Beaverton, OR (US); Michael Tripp, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/540,840

(22) Filed: Sep. 29, 2006

(65) Prior Publication Data

US 2008/0082285 A1  Apr. 3, 2008

(51) Int. Cl.
*G06F 19/00* (2006.01)
(52) U.S. Cl. ...................................... 702/118
(58) Field of Classification Search ............ 702/118
See application file for complete search history.

(56) References Cited

OTHER PUBLICATIONS

Alon Naveh, Intel Technology Journal, Intel Centrino Duo Mobile Technology, vol. 10, Issue 02, p. 109-122, Published May 15, 2006.*
http://www.merriam-webster.com/dictionary/boundary, p. 1.*

* cited by examiner

*Primary Examiner*—Tung S Lau
(74) *Attorney, Agent, or Firm*—Buckley, Maschoff & Talwalkar LLC

(57) ABSTRACT

A method, apparatus, article of manufacture, and system, the method including, in some embodiments, performing an in-system (or in-the-field) self-test on a first core of a multi-core (or multi-CPU) processor to obtain at a value for at least one operational parameter of the first core, storing the value for the at least one operational parameter of the first core, testing, under control of the first core, at least one of a remaining set of cores of the multi-core processor to determine a value for the at least one operational parameter for the at least one core of the remaining set of cores, and testing, under control of the at least one core of the remaining set of cores, the first core to determine a value for the at least one operational parameter for the first core.

10 Claims, 4 Drawing Sheets

METHOD AND SYSTEM TO SELF-TEST SINGLE AND MULTI-CORE CPU SYSTEMS

BACKGROUND

A reliability and stability of a device, system, platform, or operating environment may depend on the device, system, platform, or operating environment operating within design specifications. Due to a number of factors, a device, system, platform, or operating environment may attempt to operate outside of the design specifications. In some instances, an out of specification condition may result from component and system degradations that may typically occur over time. In some instances however the out of specification condition may be the result of, for example, thermal stresses, manufacturing variances, and/or operating variations.

Operationally, an out of specification operating condition may result in a decrease in device and system reliability and stability. In some instances, a device and system may be manufactured to certain specifications, tested at controlled settings to determine minimum and/or maximum operating parameters, and limited to operating in a safe region within the determined range of minimum and maximum operation parameters. However, by constraining the device and system to operate within the "safe" region the device and system may operate at less than its full potential.

DETAILED DESCRIPTION

The several embodiments described herein are solely for the purpose of illustration. Embodiments may include any currently or hereafter-known versions of the elements described herein. Therefore, persons skilled in the art will recognize from this description that other embodiments may be practiced with various modifications and alterations.

Figure 1:
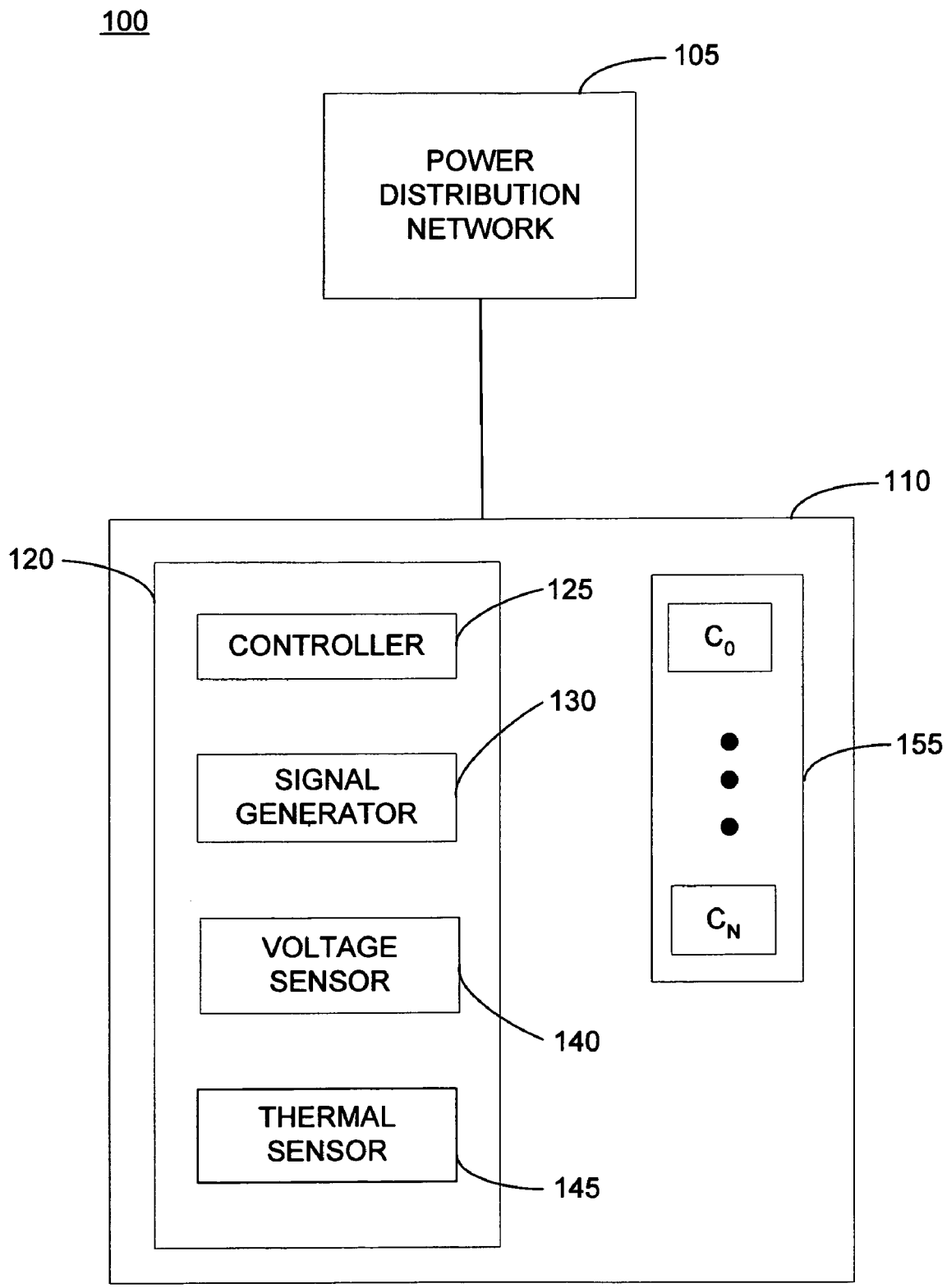
FIG. 1 is an exemplary depiction of an apparatus, in accordance with some embodiments herein.

FIG. 1 is an exemplary depiction of an apparatus 100, in accordance with some embodiments herein. Apparatus 100 may include more, fewer, and alternate components and devices than those shown in FIG. 1. A power distribution network 105 supplies power to CPU (central processing unit) 110. CPU 110 may be a microprocessor including one or more cores 115 ($C_0$-$C_N$).

Device 120 provides a mechanism for implementing an in-system (or in-field) self-test of operational parameters of the cores of multi-core CPU 110, in accordance with embodiments herein.

Device 120 may include a controller 125 to control various aspects of a self-test in accordance with embodiments herewith, a signal generator 130 that may generate signals at various frequencies and voltages, a voltage sensor 135, and a frequency sensor 145 to measure an operational frequency of multi-core CPU 110. In some embodiments, device 120 is included on the same die as multi-core CPU 155. Device 120 and multi-core CPU 155 may be included on the same die, same package, same circuit board (e.g. multi-CPU board), etc. at a time of manufacture.

Controller 125 may operate in accordance with some embodiments herein. Controller 125 may execute code and program instructions to implement some of the methods and operations disclosed herein. In some embodiments, device 120 and controller 125 may include a register or cache (not shown) to store operational parameters.

In some embodiments, cores 115 ($C_0$-$C_N$) may be fabricated on a common die. In some embodiments, cores 115 ($C_0$-$C_N$) may be manufactured using the same design specifications (i.e., be identical). In some embodiments, cores 115 ($C_0$-$C_N$) are arranged in an array in a multi-chip module.

In some embodiments the microcontroller and the multitude of cores may be supplied from different sources.

According to some power and thermal management protocols, a device may operate within a range of operational parameters. Operating characteristics of the device may, in some instances, be varied or adjusted during operation of the device within the operational limits for the device. For example, a CPU may be safely and reliably operated between a minimum voltage ($V_{min}$) and a minimum frequency ($F_{min}$) at two ends of a specified operating range and a maximum voltage ($V_{max}$) and a maximum frequency ($F_{max}$) at other ends of the operating range.

Some devices may further have a need or requirement to retain state at a voltage ($V_{ret}$) that is less than or equal to the minimum voltage ($V_{min}$). Herein, the $V_{ret}$ refers, in general, to the voltage needed to maintain basic operational functions of CPU 110.

Operationally, performance of electronic devices may vary over time due to, for example, component degradation. The degradation of the device may have the effect of changing the operational characteristics of the device. For example, oxide-related degradation of a semiconductor device may result in a maximum or minimum operating voltage and/or frequency of the device changing from a previous maximum or minimum operating voltage and/or frequency, respectively. To account for and possibly anticipate device variances, including variances due to thermal stresses and component degradation, the operational parameters of a device may have a "margin of safety" factored into the device specifications as guard-bands. While this "guard-banding" of the device may be provided to ensure functionality of the device, such functionality may be less than the full potential performance of the device.

Figure 2:
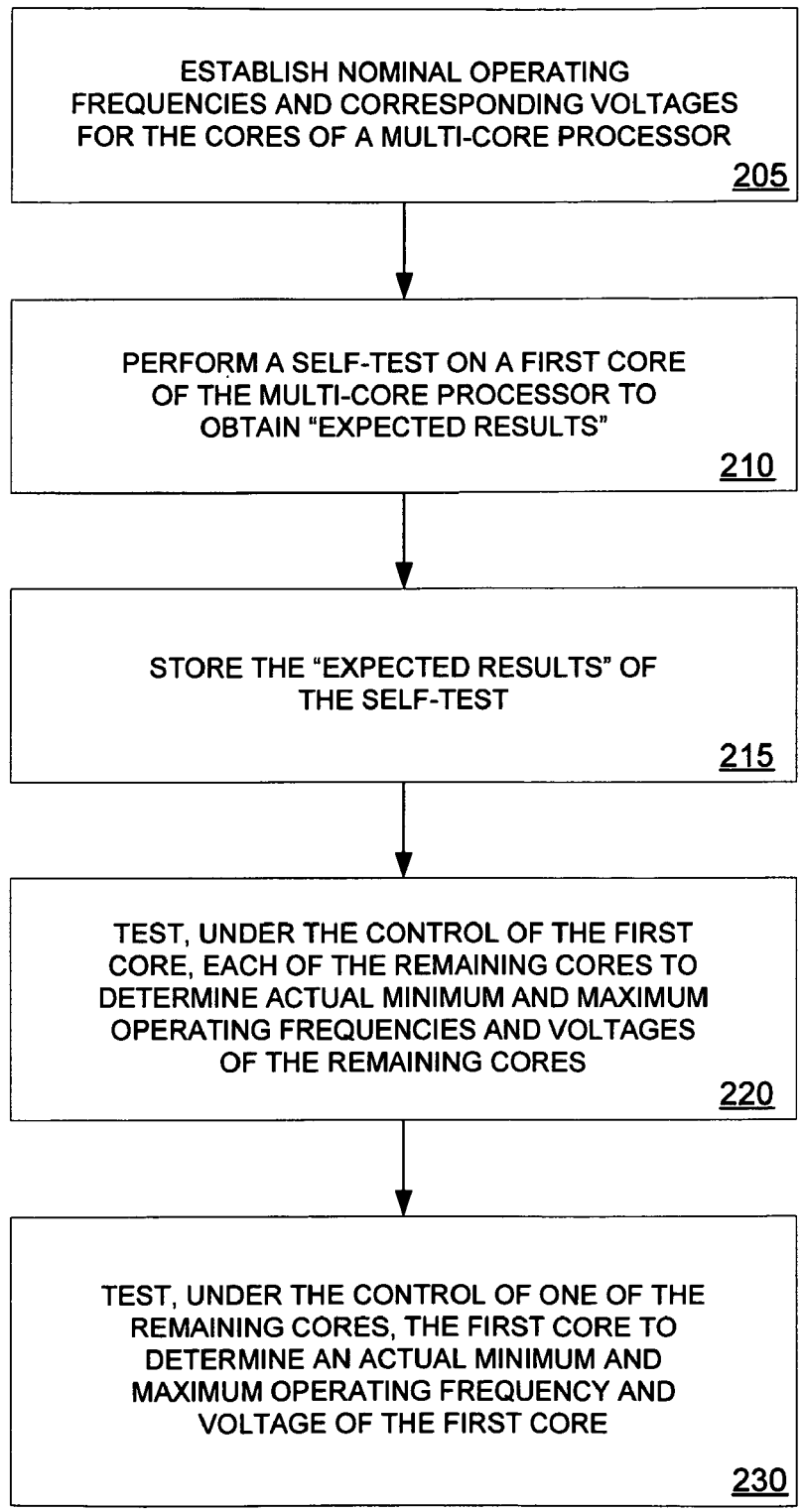
FIG. 2 is an exemplary flow diagram of a process, in accordance with some embodiments herein.

FIG. 2 is an exemplary flow diagram of a self-test process 200, in accordance with some embodiments herein. Process 200 may be used to determine operating parameters of one or more processor cores of a multi-core processor.

At operation 205, nominal operating frequencies and corresponding voltages may be established for the core of the multi-core process. In some embodiments, the nominal values are established during or at the end of a manufacturing process of the multi-core processor. The nominal parameters may include a measure of safety or "guard-bands". The guard-bands referred to herein are established by not setting the range of an operational parameter at its true boundaries but instead reducing the range of the operational parameters to offer an increased degree of acceptable operation. The guard-bands may compromise a peak performance of the multi-core processor.

Whether the nominal values include guard-bands or not, the nominal values do not account for or compensate for variations in operation that depart from the factory specifications, differences between the individual cores, differences caused by degradation of core performance, and even differences caused by the platform in which the CPU is placed and required to operate.

At operation 210, a self-test is initiated by a first core (e.g., $C_0$) of the multi-core CPU 110. The self-test may be implemented as a test program and a test suite delivered in firmware, or software. Such firmware may be at least in communication with device 120. The test program runs the test suite. The test suite may be provided to system Original Equipment Manufactures (OEMs), specific component manufactures, Operating System (OS) vendors, etc. In some embodiments, the test suite may be embodied in add-on firmware, non-volatile memory integrated into a multi-chip module, and as a stand-alone Flash/ROM memory chip. In some embodiments, the test suite pattern may be provided on at least a portion of a secure memory device (e.g., a hard disk drive). In other embodiments the test suite may be provided as add-on software.

The test program to determine the operational values herein (e.g., $F_{max}$, $F_{min}$, $V_{max}$, $V_{min}$, and $V_{ret}$) may be stored and delivered in a variety of formats and media, including those discussed herein regarding the test suite. In some embodiments, the test program may be stored in a CPU ROM (read only memory) or an integrated microcontroller.

Operation 210 may be invoked upon power-up or other instances of the operation of the multi-core CPU. Other times of interest may include a CPU idle period, scheduled events, and other time sequences. A first core (e.g. $C_0$) may operate at a frequency and voltage, safely lower than the $F_{max}$ at $V_{max}$ or $F_{min}$ at $V_{min}$ specified for the first core. The first core runs the test program to execute at least parts of the test suite to obtain "expected results". The results obtained are referred to as expected results since the first core is operated at the nominal values of frequency and voltage during the determination thereof.

The expected results of the self-test are stored at operation 215. The expected results may be used in a process of determining the operational parameters of the other remaining cores of multi-core CPU 110. In some embodiments, the storage location of the expected results may be accessed by each of the remaining cores. In other embodiments, the expected results may be provided in the firmware or SW test suite itself, as expected data files.

At operation 220, each of the remaining cores other than the first core is tested under the control of the first core. Each of the remaining cores is placed under test to determine the actual minimum and maximum operating frequencies and voltages of the subject core. The actual minimum and maximum operating frequencies and voltages of the remaining cores may be individually determined by subjecting each core to test patterns of varying frequencies and voltages, as indicated by the test suite. For example, a core may be operated at a specific voltage and frequency thought to be safely between $F_{max}$ and $F_{min}$. The results of the tests of the remaining cores may be compared to the expected results obtained by the testing of the first core (operation 210) to determine whether the test result voltage is within the acceptable operational range of the core under test (CUT). If the CUT result matches the expected result then the frequency and voltage is within the actual operational range of the CUT. If the CUT result does not match the expected result then the frequency is outside of the actual operational range of the CUT.

As an example, during the testing of one of the remaining cores, the frequency of the CUT may be initially set lower than its branded $F_{max}$ but set at its highest branded voltage $V_{max}$. At the end of each test sequence, the results are checked by the first core for correctness against the stored expected values. The frequency may then be increased in a next round of testing, and so on, until a failure is detected. The frequency of the failure and a pre-determined relatively smaller guard-band may be stored in the CUT or CPU microcontroller as the maximum safe operating frequency of the CUT, at the tested voltage, in that platform (i.e., actual operational parameter). A similar test may be conducted on the CUT at other voltages corresponding to operational states of the core and CPU.

In a similar manner regarding the determination of $V_{min}$, a supply voltage is initially set higher than is required for $F_{min}$ operation, and the voltage is decreased until a failure is detected at the branded $F_{min}$. Also, the state retention voltage, Vret, may be obtained by lowering the operational voltage until a state loss is detected.

Operation 220 may be performed repeatedly until a reasonably finite range of useful combinations of $F_{max}$, $F_{min}$, $V_{max}$, $V_{min}$, and $V_{ret}$ are determined for a CUT. In some embodiments, a number of iterations of the test program may be performed to obtain all of the desired test results for each of the remaining cores of the multi-core processor.

In some embodiments, operations 210-220 are performed for each of the parameters $F_{max}$, $F_{min}$, $V_{max}$, and $V_{min}$ for each of the remaining cores (N–1) of a multi-core CPU having (N) cores.

At operation 225, the first core is tested under the control of one of the remaining cores for which actual operational parameters were determined at operation 220.

Thus, process 200 provides a self-test mechanism to obtain actual operational parameters for all of the cores of a multi-core CPU.

Figure 3:
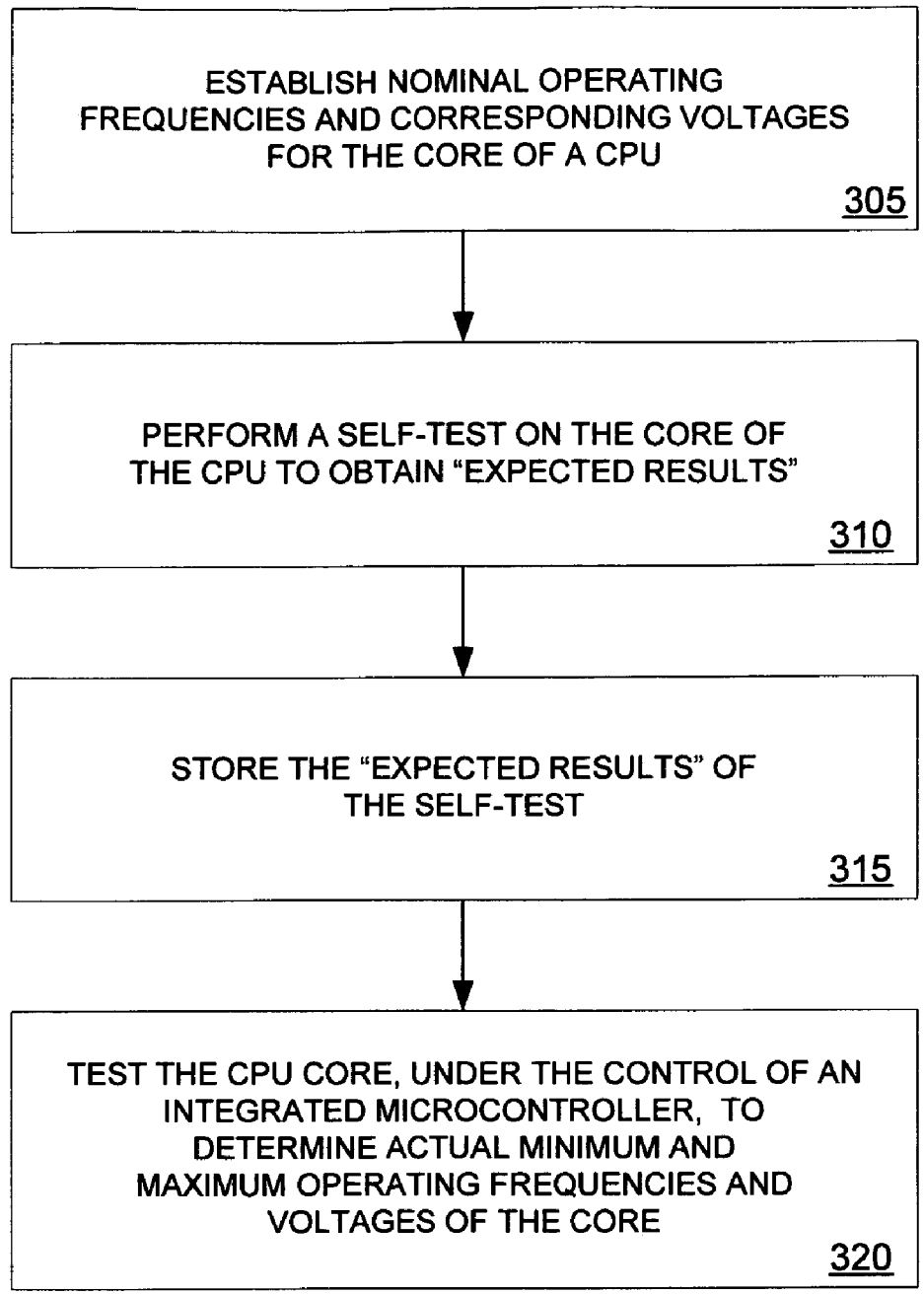
FIG. 3 is an exemplary flow diagram of a process, in accordance with some embodiments herein.

FIG. 3 is an exemplary flow diagram of a self-test process 300, in accordance with some embodiments herein. Process 300 may be applicable to a CPU having a single core.

Operation 305 may be similar to operation 205. The difference being that the nominal values established by operation 305 relate to a single core CPU. Operation 310 may be similar to operation 210, the difference here also being the self-test is performed on the only core of the single CPU of operation 310.

At operation 315, the expected results of operation 310 are stored in a memory accessible by the core of the CPU and a microcontroller integrated therewith, either guaranteed to be safely operational at all voltage and frequency ranges, or operating under different, but safe voltage and frequency.

At operation 320, the core is tested under the control of a microcontroller integrated with the single core CPU. The core is placed under test to determine the actual minimum and maximum operating frequencies and voltages of the CPU. The actual minimum and maximum operating frequencies and voltages of the core are determined by subjecting the core to test patterns under varying frequencies and voltages, as indicated by the test suite. The result of the testing of the core may be compared to the expected results of the core to determine whether the test voltage is within the specified operational range of the core.

Operation 320 may be performed repeatedly until each of $F_{max}$, $F_{min}$, $V_{max}$, $V_{min}$, and $V_{ret}$ are determined for the CPU. In some embodiments, a number of iterations of the test program may be performed to obtain all of the desired test results for the single core CPU.

Figure 4:
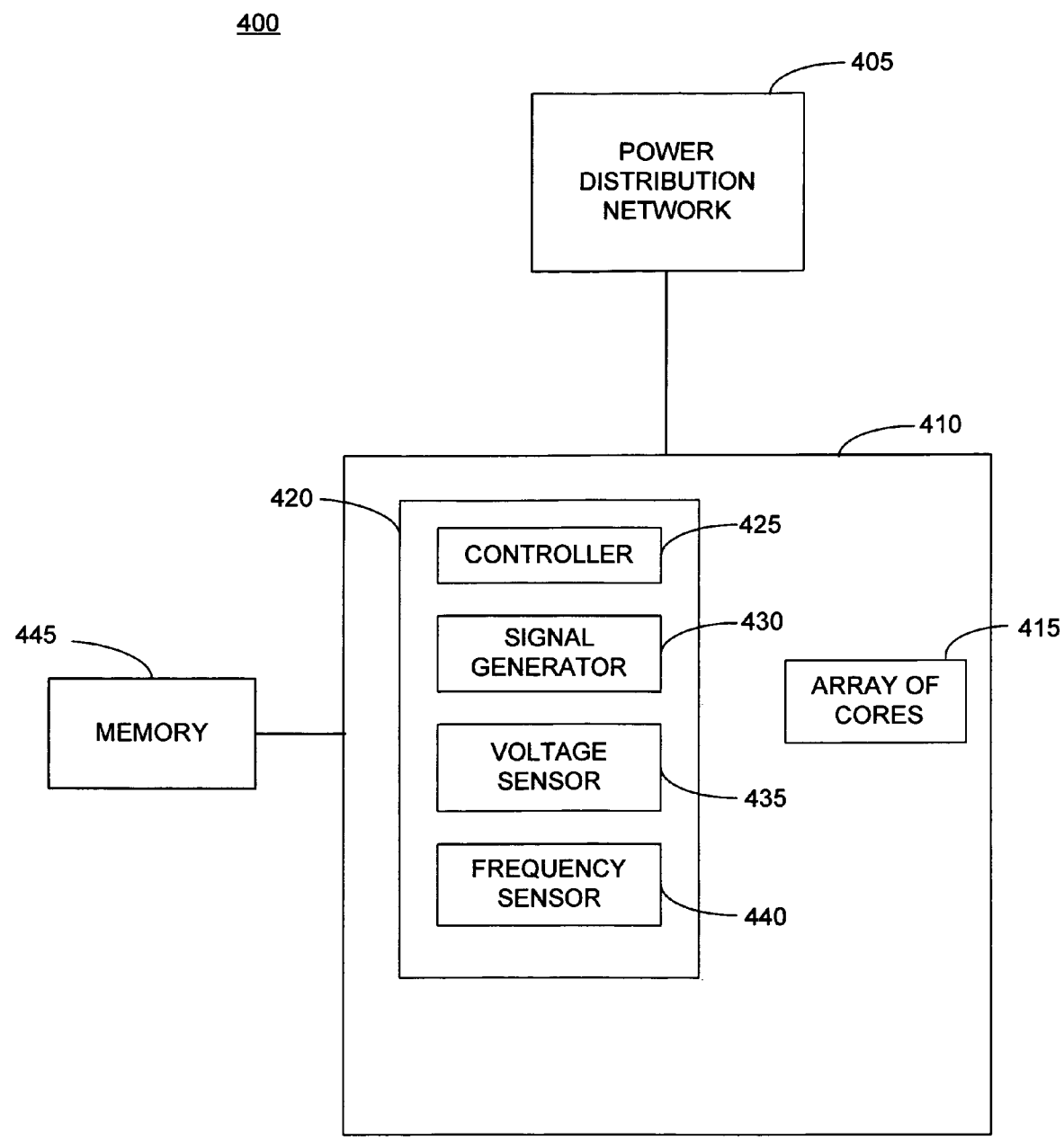
FIG. 4 is an exemplary depiction of a system, according to some embodiments herein.

FIG. 4 is an exemplary depiction of a system 400, in accordance with some embodiments herewith. System 400 may include a power distribution network 405 that supplies power to a microprocessor 410, including one or more processor cores 415. Device 420 may include a controller 425 to control various aspects of the self-test processes disclosed herein in connection with at least some embodiments herewith. Device 420 also includes a variable signal generator 430, a voltage sensor 435, and a frequency sensor 440. In some embodiments, device 420 is included on the same die as the array of processor cores 415. System 400 may further include a memory 445 attached to microprocessor 410.

Those skilled in the art should appreciate that system 400 may include additional, fewer, or alternative components to power distribution network 405, microprocessor 410, device 420, and memory 445. Memory 445 may comprise any type of memory for storing data, including but not limited to a Single Data Rate Random Access Memory, a Double Data Rate Random Access Memory, or a Programmable Read Only Memory.

System 400 may be a part of a larger system, device, or network device. For example, system 400 may comprise a personal computer, a mobile computing/computing device, and a network server.

It should be appreciated that the drawings herein are illustrative of various aspects of the embodiments herein, not exhaustive of the present disclosure.

What is claimed is:

1. A method comprising:
    performing an in-system self-test on a first core of a multi-core processor to obtain at a value for at least one operational parameter of the first core;
    storing the value for the at least one operational parameter of the first core;
    testing, under control of the first core, at least one core of a remaining set of cores of the multi-core processor to determine minimum operating frequency, a maximum operating frequency, a minimum operating voltage, a maximum operating voltage, and a state retention voltage value for the at least one core of the remaining set of cores; and
    testing, under control of one core of the remaining set of cores, the first core to determine at least one of a minimum operating frequency, a maximum operating frequency, a minimum operating voltage, a maximum operating voltage, and a state retention voltage value for the first core.

2. The method of claim 1, wherein the performing of the self-test is performed automatically upon a power-on of the multi-core processor.

3. The method of claim 1, wherein the nominal operating frequencies and corresponding voltages are based on a design operational specification of the multi-core processor.

4. The method of claim 1, wherein any one of the remaining set of cores of the multi-core processor may be used to control the testing of the first core.

5. The method of claim 1, wherein a core under test is isolated from other components using at least one of hardware and software isolation.

6. The method of claim 1, wherein each core of the remaining set of cores is tested under the control of the first core.

7. A method comprising:
    performing an in-system self-test on a core of a single-core processor to obtain at a value for at least one operational parameter of the core;
    storing the value for the at least one operational parameter of the core;
    testing the core, under control of a controller connected to the core, to determine a minimum operating frequency, a maximum operating frequency, a minimum operating voltage, a maximum operating voltage, and a state retention voltage value for the core.

8. The method of claim 7, wherein the performing of the self-test is performed automatically upon a power-on of the single-core processor.

9. An article of manufacture having program instructions embodied thereon, the article of manufacture comprising:
    program instructions to perform an in-system self-test on a first core of a multi-core processor to obtain a value for at least one operational parameter of the first core;
    program instructions to store the value for the at least one operational parameter of the first core;
    program instructions to test, under control of the first core, at least one core of a remaining set of cores of the multi-core processor to determine a minimum operating frequency, a maximum operating frequency, a minimum operating voltage, a maximum operating voltage, and a state retention voltage value for the at least one core of the remaining set of cores; and
    program instructions to test the first core, under control of one core of the remaining set of cores, to determine at least one of a minimum operating frequency, a maximum operating frequency, a minimum operating voltage, a maximum operating voltage, and a state retention voltage value for the first core.

10. The article of manufacture of claim 9, further comprising program instructions to perform the self-test automatically upon a power-on of the multi-core processor.

* * * * *